Patented June 2, 1953

2,640,864

UNITED STATES PATENT OFFICE 2,640,864

PREPARATION OF POROUS ZINC ELECTRODES

Adolph Fischbach, Red Bank, and Frederick Hochberg, Loch Arbour, N. J., assignors to the United States of America as represented by the Secretary of the Army No Drawing. Application June 27, 1951, Serial No. 233,928

5 Claims. (Cl. 136—126)

(Granted under Title 35, U. S. Code (1952), sec. 266)

The invention described herein may be manufactured and used by or for the Government for governmental purposes, without the payment of any royalty thereon.

This invention relates to porous zinc electrode for primary batteries and to methods of making such electrodes. It is a general object of this invention to produce a lightweight, porous zinc electrode which can be used as a negative electrode in various electro-chemical systems using various electrolytes, providing in each case a battery of high capacity per unit of weight and volume, high discharge rate and excellent operating characteristics at temperatures as low as —70° F.

The following description taken in connection with the appended claims represents specific embodiments of the broad inventive idea.

In preparing the porous zinc electrodes according to the invention zinc oxide is mixed with water to form a thick paste. This mixture is pasted into a supporting grid consisting of a gauze, net or screen made of very thin metal wire such as copper, silver, nickel, aluminum or the like as described in a copending application Serial No. 205,166, filed January 9, 1951, in the name of Fischbach and Linden. The screen wire may be as thin as 0.01 inches or less. The thickness of a screen is about double the thickness of the wire used to weave the screen; it is, however, possible to press the woven screen down almost to the thickness of a single wire. If, therefore, extremely thin grids are required, the screens are pressed after weaving. Various wire screens, e. g., 16/16 or 45/45 mesh, using various thicknesses up to 0.02 inch and more have been satisfactorily used. Finished pasted electrodes, with less than about 0.04 inch thickness and of extreme lightweight, can thus be made showing sufficient mechanical strength and adequate electric characteristics.

If copper wire is used it is advantageous to electro-plate the wire with a protecting and impervious coating of lead, manganese or preferably zinc which coatings prevent corrosion or dissolution of the screen metal by the electrolyte. If the battery is to be used as a "one-shot" battery (that is discarded after initial use) the copper wire does not have to be coated. However, where the battery is expected to have good charge retention after activation it is better to protect the grid material. The screen may or may not be pressed before the protective coating is put on.

After pasting the zinc oxide into the grids of the above-described character the pasted plates are air or oven dried and then submitted for a very short time (10 to 15 seconds) to temperatures of about 500 to 700° C. This heat treatment of the surface of the pasted plates hardens the surface of the paste so as to prevent shedding of the zinc oxide on subsequent immersion into the forming solution. The forming of the electrode after this heat treatment of the surface is carried out in weak acids, weak alkalies or solutions of neutral salts. During the formation the active material extends considerably which ultimately results in the formation of a metallic zinc of very spongy structure. After formation the plate may be given a light rolling without too much pressure to reduce the thickness of the plate without impairing its spongy structure. Any other equivalent mechanical treatment may be used which brings the plate near to the original thickness. The plate is then thoroughly washed to remove the forming solution and is then air or oven dried.

The porous zinc electrode made according to the invention may be used as a negative electrode in combination with various electro-chemical systems and suitable acid or alkaline electrolytes. It may, for instance, be used with a silver peroxide or mercuric oxide counter electrode and potassium hydroxide as electrolyte; or it may be used with a lead peroxide counter electrode with sulphuric acid or fluorboric acid as electrolyte. In any such combination the porous zinc plate furnishes batteries of relatively high capacity and high discharge rates at temperatures as low as —70° F.

The new porous zinc electrode is therefore particularly suitable for the manufacture of lightweight batteries which are to supply relatively high current output for prolonged periods of time at very low temperatures such as required for radiosonde transmitters and other special purpose applications. Batteries for such application are generally of the deferred action type, in which the electrodes are separated by spacers of bibulous ionically conductive material such as paper, microsponge rubber, etc. Deferred action type batteries made with a porous zinc electrode according to this invention may be quickly activated even at extremely low temperatures by immersing them partially in well known manner into a suitable electrolyte for about one to three minutes after which time the battery is withdrawn from the electrolyte, shaken to remove excess liquid and is then immediately ready for use.

What is claimed is:

1. A method of making a lightweight porous zinc negative electrode for primary batteries comprising making a pasty mixture of zinc oxide and water, pasting said mixture into a supporting metal screen, drying said plate electrode and then submitting it for a very short time to temperatures above 300° C., forming said electrode cathodically in a forming solution to sponge zinc and finally washing and drying said sponge zinc electrode.

2. In a method of making a porous zinc electrode according to claim 1 in which said dried plate is submitted for a very short time to temperatures of about 500° to 700° C.

3. In a method of making a porous zinc electrode according to claim 1 in which said dried electrode is submitted to temperatures of about 500° to 700° C. for a period of about ten to fifteen seconds.

4. In a method of making a lightweight porous zinc electrode for primary batteries comprising making a pasty mixture of zinc oxide and water, pasting said mixture into a supporting metal screen, drying said plate electrode, submitting said dried electrode for a very short time to temperatures above 300° C., forming said electrode cathodically in a forming solution to sponge zinc, reducing the thickness of the spongy zinc structure by applying slight pressure to the surface of the plate and finally washing and drying said sponge zinc electrode.

5. In a method of making a lightweight porous zinc electrode for primary batteries comprising making a pasty mixture of zinc oxide and water, pasting said mixture into a supporting metal screen, drying said plate electrode, submitting said dried electrode for a very short time to temperatures of about 500° to 700° C. for a period of about ten to fifteen seconds, forming said electrode cathodically in a forming solution to sponge zinc, reducing the thickness of the spongy zinc structure by applying slight pressure to the surface of the plate and finally washing and drying said sponge zinc electrode.

ADOLPH FISCHBACH.
FREDERICK HOCHBERG.

References Cited in the file of this patent

UNITED STATES PATENTS

| Number | Name | Date |
|---|---|---|
| 704,767 | Steinmetz | July 15, 1902 |
| 708,695 | Christian | Sept. 9, 1902 |
| 2,501,673 | Glassner | Mar. 28, 1950 |

FOREIGN PATENTS

| Number | Country | Date |
|---|---|---|
| 503,875 | Great Britain | Apr. 17, 1939 |